(12) United States Patent
Soppin et al.

(10) Patent No.: US 11,144,985 B2
(45) Date of Patent: Oct. 12, 2021

(54) METHOD AND SYSTEM FOR ASSISTING USER WITH PRODUCT HANDLING IN RETAIL SHOPPING

(71) Applicant: Wipro Limited, Bangalore (IN)

(72) Inventors: Shashidhar Soppin, Bangalore (IN); Manjunath Ramachandra Iyer, Bangalore (IN); Chandrashekar Bangalore Nagaraj, Bangalore (IN)

(73) Assignee: Wipro Limited, Bangalore (IN)

( * ) Notice: Subject to any disclaimer, the term of this patent is extended or adjusted under 35 U.S.C. 154(b) by 80 days.

(21) Appl. No.: 16/782,088

(22) Filed: Feb. 5, 2020

(65) Prior Publication Data

US 2021/0182945 A1 Jun. 17, 2021

(30) Foreign Application Priority Data

Dec. 13, 2019 (IN) .............................. 201941051846

(51) Int. Cl.
*G06Q 30/00* (2012.01)
*G06Q 30/06* (2012.01)
*G06N 20/00* (2019.01)

(52) U.S. Cl.
CPC ......... *G06Q 30/0639* (2013.01); *G06N 20/00* (2019.01); *G06Q 30/0627* (2013.01)

(58) Field of Classification Search
None
See application file for complete search history.

(56) References Cited

U.S. PATENT DOCUMENTS

| 7,424,447 B2 * | 9/2008 | Fuzell-Casey | G06Q 30/02 |
| | | | 705/26.81 |
| 8,669,864 B1 | 3/2014 | Tedesco et al. | |
| 10,040,628 B1 * | 8/2018 | Misra | G06Q 10/08 |
| 10,071,893 B2 | 9/2018 | High et al. | |
| 2009/0121017 A1 * | 5/2009 | Cato | G06Q 10/087 |
| | | | 235/385 |

(Continued)

OTHER PUBLICATIONS

Abhaya Asthana et al. "An Indoor Wireless System for Personalized Shopping Assistance", Mobile Computing System and Applications, 1994, pp. 69-74. (Year: 1994).*

(Continued)

*Primary Examiner* — Naeem U Haq
(74) *Attorney, Agent, or Firm* — Finnegan, Henderson, Farabow, Garrett & Dunner, LLP (57) ABSTRACT

The present invention discloses a method and a system for assisting user with product handling in a retail shopping. The method comprising identifying one or more products from a list of products that user intends to purchase, neighbouring products and orientations of the one or more products and the neighbouring products from a plurality of image frames and rack information, comparing the identified orientations with historic orientations of products and neighbouring products associated with the rack information, identifying at least one product from the one or more products and the neighbouring products that is improperly oriented based on comparison, determining product safety handling instructions of the identified at least one product and assisting the user in real-time with handling of the identified at least one product based on the product safety handling instructions.

17 Claims, 6 Drawing Sheets

(56) References Cited

U.S. PATENT DOCUMENTS

2019/0318417 A1* 10/2019 Gumaru .............. G06K 7/1413
2020/0401987 A1* 12/2020 Deng ..................... H04N 5/247

OTHER PUBLICATIONS

Duarte, K., et al., "SmartGuia: Shopping Assistant for Blind People", Coimbra, 2014, 265 pages.

Tonioni, AL, et al., "A deep learning pipeline for product recognition on store shelves", Oct. 2018, 9 pages.

* cited by examiner

METHOD AND SYSTEM FOR ASSISTING USER WITH PRODUCT HANDLING IN RETAIL SHOPPING

TECHNICAL FIELD

The present subject matter is generally related to enhancing retail interaction of a user in real-time, more particularly, but not exclusively, to a method and a system for assisting a user with product handling in a retail shopping environment.

BACKGROUND

In retail shopping environment, there are many supporting devices and applications that aim to provide seamless shopping experience to users. Most of these solutions aim at detection of products, selection of required products, guiding the users to a rack based-on interested/requested products and providing the users with smart cart for an easy user experience. However, the challenge arises when a person wants to access displayed products in racks of a retail store. There would be products or objects on the rack or on a route to the rack, which if not handled correctly would cause harm or injury to the person due to nature of object or placement of the object. For example, a person may get injured or harmed if he/she tries to pick up a product like a sharp object with protruding edges, for example, knife that is not placed correctly. Furthermore, a person of low height will not be able to reach a specific product and sometimes end up not picking it correctly, which may cause harm or injury to the person. For example, a kid should be guided in the right way to pick a product that is placed high in the rack above his/her height. Most of the time, the above-mentioned scenarios evolve dynamically and are not addressed by the existing solutions.

The information disclosed in this background of the disclosure section is for enhancement of understanding of the general background of the invention and should not be taken as an acknowledgement or any form of suggestion that this information forms the prior art already known to a person skilled in the art.

SUMMARY

In an embodiment, the present disclosure may relate to a method of assisting user with product handling in a retail shopping in real-time. The method includes extracting a list of products from a handheld device associated with a user and historic user details of the user from a database, receiving a plurality of image frames of one or more products from the list of products and neighbouring products in a rack from the handheld device and Internet of Things (IoT) sensors attached to the rack, identifying at least one of product type of the one or more products, neighbouring product type of the neighbouring products and orientations of the one or more products and the neighbouring products from the plurality of image frames and rack information corresponding to the rack stored in the database, comparing the identified orientations of the one or more products and the neighbouring products with historic orientations of products and neighbouring products associated with the rack from the database, identifying at least one product from the one or more products and the neighbouring products that is improperly oriented based on comparison, determining product safety handling instructions of the identified at least one product based on historic product details stored in the database and the identified orientations of the at least one product, and assisting the user in real-time with handling of the identified at least one product based on the product safety handling instructions.

In an embodiment, the present disclosure may relate to a product assistance system for assisting user with product handling in a retail shopping in real-time. The product assistance system may include a processor and a memory communicatively coupled to the processor, wherein the memory stores processor-executable instructions, which on execution, cause the processor to extract a list of products from a handheld device associated with a user and historic user details of the user from a database, receive a plurality of image frames of one or more products from the list of products and neighbouring products in a rack from the handheld device and IoT sensors attached to the rack, identify at least one of product type of the one or more products, neighbouring product type of the neighbouring products and orientations of the one or more products and the neighbouring products from the plurality of image frames and rack information corresponding to the rack stored in the database, compare the identified orientations of the one or more products and the neighbouring products with historic orientations of products and neighbouring products associated with the rack from the database, identify at least one product from the one or more products and the neighbouring products that is improperly oriented based on comparison, determine product safety handling instructions of the identified at least one product based on historic product details stored in the database and the identified orientations of the at least one product, and assist the user in real-time with handling of the identified at least one product based on the product safety handling instructions.

In an embodiment, the present disclosure may relate to a non-transitory computer readable medium including instructions stored thereon that when processed by at least one processor cause a product assistance system to perform operations comprising extracting a list of products from a handheld device associated with a user and historic user details of the user from a database, receiving a plurality of image frames of one or more products from the list of products and neighbouring products in a rack from the handheld device and Internet of Things (IoT) sensors attached to the rack, identifying at least one of product type of the one or more products, neighbouring product type of the neighbouring products and orientations of the one or more products and the neighbouring products from the plurality of image frames and rack information corresponding to the rack stored in the database, comparing the identified orientations of the one or more products and the neighbouring products with historic orientations of products and neighbouring products associated with the rack from the database, identifying at least one product from the one or more products and the neighbouring products that is improperly oriented based on comparison, determining product safety handling instructions of the identified at least one product based on historic product details stored in the database and the identified orientations of the at least one product, and assisting the user in real-time with handling of the identified at least one product based on the product safety handling instructions.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The accompanying drawings, which are incorporated in and constitute a part of this disclosure, illustrate exemplary embodiments and together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described below, by way of example only, and with reference to the accompanying figures.

It should be appreciated by those skilled in the art that any block diagrams herein represent conceptual views of illustrative systems embodying the principles of the present subject matter. Similarly, it will be appreciated that any flowcharts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternatives falling within the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

Embodiments of the present disclosure provide a solution for assisting a user for handling harmful product in a retail shopping environment. Furthermore, the present disclosure uses a new mechanism to build a product model to identify products, which the user has interest to purchase, its neighbouring products and position of the product and its neighbouring products. The present disclosure uses Capsule Neural Network (Capsule Net model), which is trained with all the product images in all orientations, which can classify a given product into different classes. The characteristic of Capsule Net model is that it can classify the image of the product into correct class given the product in any orientation in the image. Later, the images of products in different orientation are annotated with appropriate safety handling captions depending on the product characteristics and position. These captions and penultimate layer output of the Capsule Net model and the classification are given as input to the bidirectional Long Short-Term Memory (LSTM) network, which is trained to generate the guided English text. The guided English text is then fine-tuned as an action or instruction message in Natural Language Processing (NLP) system with appropriate instructions to the user based on user details and user characteristics. This approach, also, guides visually disabled person on how to handle hazardous, misplaced, disorientated or wrongly placed objects in the retail shopping environment. In addition, the present disclosure guides the user to prevent or avoid any dangerous situations in the retail shopping environment by making sure safe route is always suggested.

Figure 1:
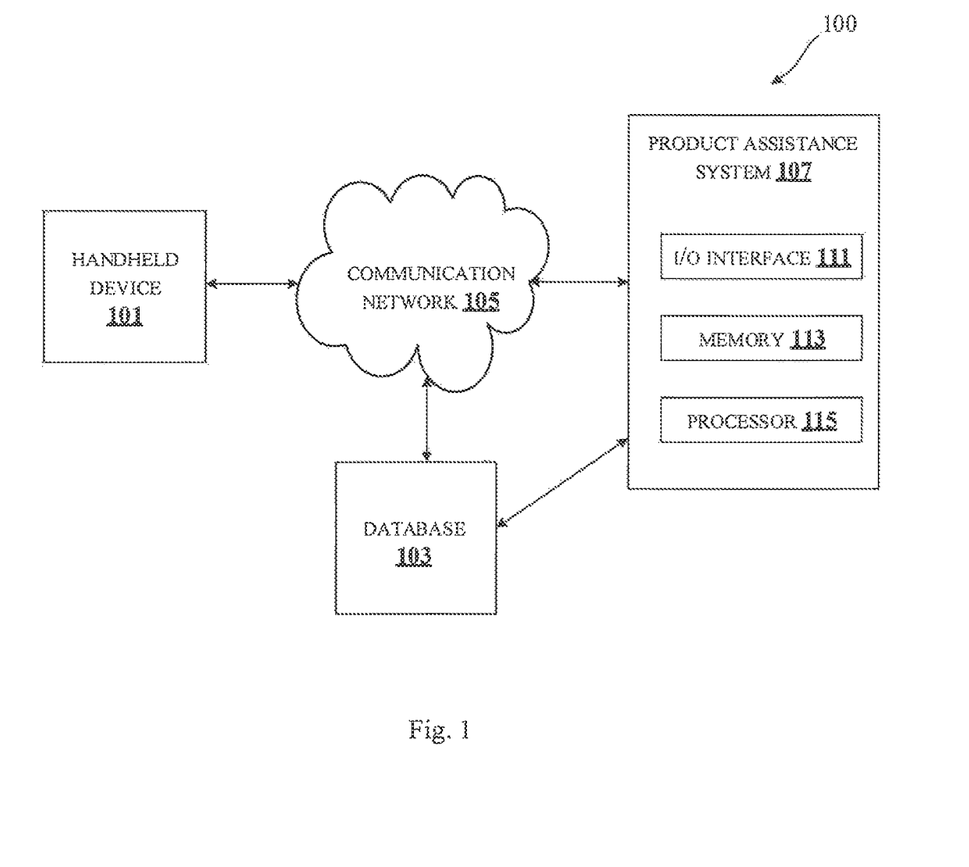
FIG. 1 illustrates an exemplary environment for assisting user with product handling in a retail shopping in real-time in accordance with some embodiments of the present disclosure.

FIG. 1 illustrates an exemplary environment for assisting user with product handling in a retail shopping in real-time in accordance with some embodiments of the present disclosure.

As shown in the FIG. 1, the environment 100 includes a handheld device 101, a database 103, a communication network 105 and a product assistance system 107. The handheld device 101 may be connected through the communication network 105 to the product assistance system 107. In an embodiment, the handheld device 101 may include, but is not limited to, a mobile terminal, a tablet computer, a camera or Personal Digital Assistant (PDA). A person skilled in the art would understand that, any electronic devices with a camera feature, not mentioned explicitly, may also be used as the handheld device 101 in the present disclosure. The handheld device 101 may provide image frames to the product assistance system 107 via the communication network 105 and may communicate with the product assistance system 107 via the communication network 105 in user preferred medium to assist a user. The image frames may be at least one of image and video. The handheld device 101 may extract item/product information by focusing on racks that contains one or more products that the user may intend to purchase. The handheld device 101 may give position of products and details of the products as images from a closer view. The communication network 105 may include, but is not limited to, a direct interconnection, an e-commerce network, a Peer-to-Peer (P2P) network, Local Area Network (LAN), Wide Area Network (WAN), wireless network (for example, using Wireless Application Protocol), Internet, Wi-Fi, Bluetooth and the like.

In the embodiment, the product assistance system 107 may assist the user with product handling in a retail shopping in real-time based on at least one product identified from one or more products and neighbouring products and their orientations. The product assistance system 107 may include an I/O interface 111, a memory 113 and a processor 115. The I/O interface 111 may be configured to receive the image frames from the handheld device 101. Analogously, the I/O interface 111 may be configured to communicate with the handheld device 101 using the user preferred medium to assist the user. The I/O interface 111 may employ communication protocols/methods such as, without limitation, audio, analog, digital, monoaural, Radio Corporation of America (RCA) connector, stereo, IEEE-1394 high speed serial bus, serial bus, Universal Serial Bus (USB), infrared, Personal System/2 (PS/2) port, Bayonet Neill-Concelman (BNC) connector, coaxial, component, composite, Digital Visual Interface (DVI), High-Definition Multimedia Interface (HDMI), Radio Frequency (RF) antennas, S-Video, Video Graphics Array (VGA), IEEE 802.11b/g/n/x, Bluetooth, cellular e.g., Code-Division Multiple Access (CDMA), High-Speed Packet Access (HSPA+), Global System for Mobile communications (GSM), Long-Term Evolution (LTE), Worldwide interoperability for Microwave access (WiMax), or the like.

The image frames received by the I/O interface 111 and a list of products extracted from the handheld device 101 associated with the user may be stored in the memory 113. The memory 113 may be communicatively coupled to the processor 115 of the product assistance system 107. The memory 113 may, also, store processor instructions which may cause the processor 115 to execute the instructions for assisting the user with product handling. The memory 113 may include, without limitation, memory drives, removable disc drives, etc. The memory drives may further include a drum, magnetic disc drive, magneto-optical drive, optical drive, Redundant Array of Independent Discs (RAID), solid-state memory devices, solid-state drives, etc.

The processor 115 may include at least one data processor for assisting the user with product handling. The processor 115 may include specialized processing units such as integrated system (bus) controllers, memory management control units, floating point units, graphics processing units, digital signal processing units, etc.

In the embodiment, the product assistance system 107 may exchange data with a database 103 directly or through the communication network 105. The database 103 may be populated or stored with historic data that includes at least one of historic images of products, historic images of neighbouring products, historic orientations of products and neighbouring products, historic product details of the products and the neighbouring products and historic user details. Here, the historic data may refer to data received from one or more handheld devices 101 by the product assistance system 107 during training phase. The historic user details may comprise at least one of user age, user gender, user preferences, user behavioural characteristics, user disability characteristics, user height and user weight. The historic product details may comprise at least one of product name, product type, product being properly oriented or improperly oriented, product handling instruction, the rack information and product characteristics. Here, the historic orientations of products and neighbouring products refer to all the possible orientations of product and neighbouring products that can be envisioned when a product is placed in a rack.

The database 103 may, also, be updated at pre-defined intervals of time. These updates may be related to at least one of the historic images of products, the historic images of neighbouring products, the historic orientations of products and neighbouring products, the historic product details of the products and the neighbouring products and the historic-user details for adaptive learning.

Figure 2:
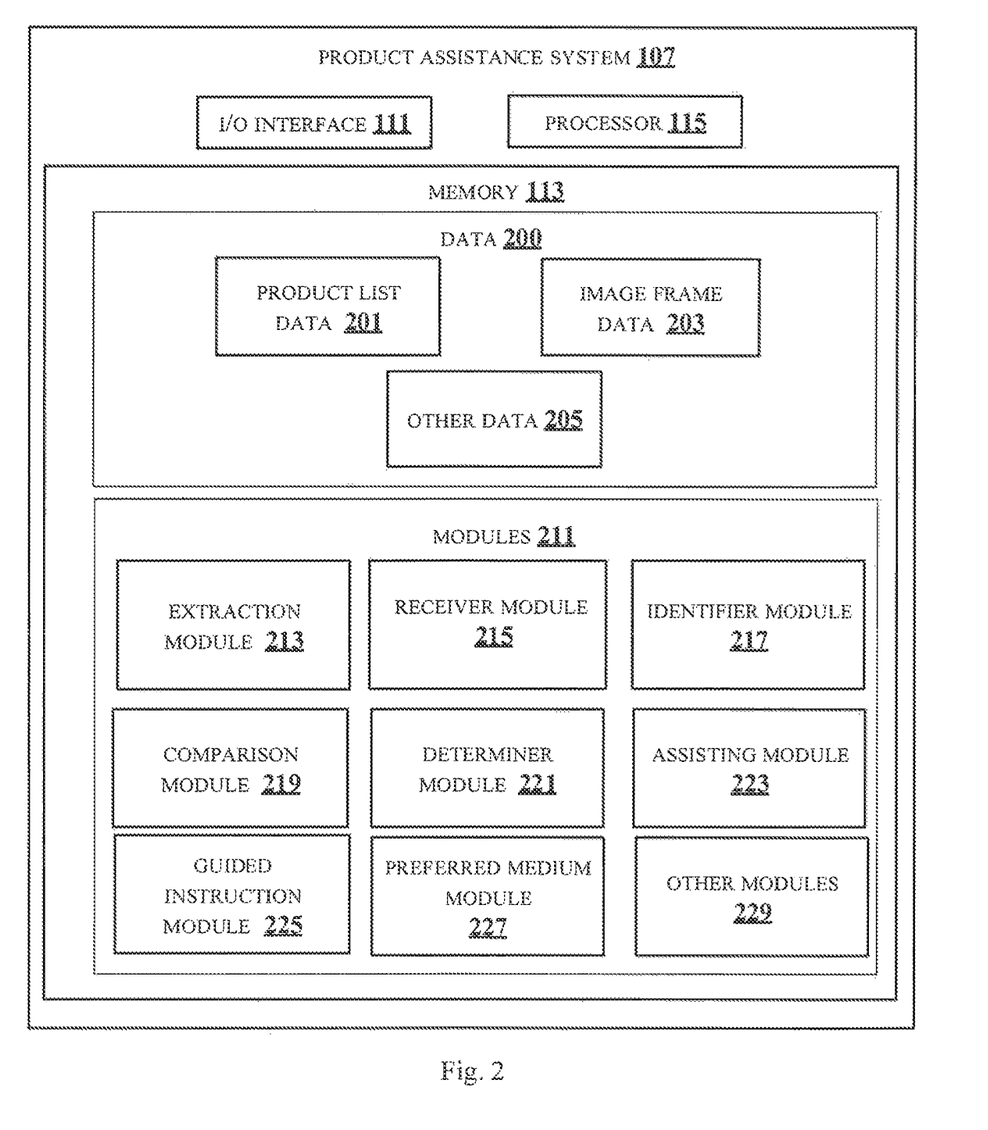
FIG. 2 shows a detailed block diagram of a product assistance system in accordance with some embodiments of the present disclosure.

FIG. 2 shows a detailed block diagram of a product assistance system in accordance with some embodiments of the present disclosure.

The product assistance system 107, in addition to the I/O interface 111 and processor 115 described above, may include data 200 and one or more modules 211, which are described herein in detail. In the embodiment, the data 200 may be stored within the memory 113. The data 200 may include, for example, product list data 201, image frame data 203 and other data 205.

The product list data 201 may include a list of products that a user intends to purchase in a shop. The product list is extracted by the product assistance system 107 from the handheld device 101 associated with the user and stored in the product list data 201.

The image frame data 203 may include a plurality of image frames of one or more products from the list of products that the user intends to purchase and neighbouring products in a rack. The plurality of image frames are received by the product assistance system 107 from the handheld device 101 and Internet of Things (IoT) sensors attached to the rack and stored in the image frame data 203. Here, the image frames may include at least one of image and video.

The other data 205 may store data, including temporary data and temporary files, generated by modules 211 for performing the various functions of the product assistance system 107.

In the embodiment, the data 200 in the memory 113 are processed by the one or more modules 211 present within the memory 113 of the product assistance system 107. In the embodiment, the one or more modules 211 may be implemented as dedicated hardware units. As used herein, the term module refers to an Application Specific Integrated Circuit (ASIC), an electronic circuit, a Field-Programmable Gate Arrays (FPGA), Programmable System-on-Chip (PSoC), a combinational logic circuit, and/or other suitable components that provide the described functionality. In some implementations, the one or more modules 211 may be communicatively coupled to the processor 115 for performing one or more functions of the product assistance system 107. The said modules 211 when configured with the functionality defined in the present disclosure will result in a novel hardware.

In one implementation, the one or more modules 211 may include, but are not limited to, an extraction module 213, a receiver module 215, an identifier module 217, a comparison module 219, a determiner module 221, an assisting module 223, a guided instruction module 225 and a preferred medium module 227. The one or more modules 211 may, also, include other modules 229 to perform various miscellaneous functionalities of the product assistance system 107.

Here, the receiver module 215 and the other modules 229 may be used in a training phase. During the training phase, the database 103 may be populated or stored with historic data that includes at least one of historic images of products, historic images of neighbouring products, historic orientations of products and neighbouring products, historic product details of the products and the neighbouring products and historic user details. The historic data may refer to data received during the training phase.

The extraction module 213 may extract a list of products from the handheld device 101 associated with a user and historic user details of the user from the database 103. The extraction module 213 may, also, extract rack information about various displayed product/item details and product positional information. This information along with stock availability may be updated in the database 103 at predefined intervals of time. For instance, as a user enters a store, the user may present a list of products he/she wants to buy. This list may be extracted from the handheld device 101 associated with the user. At the same time, historic user details of the user may be extracted from the database 103.

The other modules 229 may provide a shopping route to access the list of products in a shop based on at least one of the list of products, the historic user details and product purchase priority of the user. For instance, based on the list of products that user intends to purchase or based on user preference from the historic user details stored in the database 103 a shopping route to access the products may be provided. In case, the user prioritizes the order in which he/she may want to purchase products, then the user may be provided with a shopping route based on his/her product purchase priority.

The receiver module 215 may receive a plurality of image frames of one or more products from the list of products and neighbouring products in a rack from the handheld device and IoT sensors attached to the rack. For instance, as the user walks through the route to buy the products, the user may use the handheld device 101 to capture the information of the products he/she wants to buy. The user may move the device 101 to cover an area around the product so that different image frames are captured which would help in knowing the type of product, neighbouring products and orientation of the products. This information is collected along with the image frames collected by the IoT sensors attached to the corresponding rack. Like the handheld device 101, the IoT sensors, also, capture image frames of the products to be bought by the user. The IoT sensors allow to capture a bigger area of the rack, vicinity and details of the products from different directions, which would give more details on position of the products and neighbouring products in a rack.

The identifier module 217 may identify at least one of product type of the one or more products, neighbouring product type of the neighbouring products and orientations of the one or more products and the neighbouring products from the plurality of image frames and rack information corresponding to the rack stored in the database. The images frames obtained from the receiver module 215 are sent to the identifier module 217. In the identifier module 217, these images are given to deep learning object detection model like Region Convolutional Neural Network (RCNN) or Stochastic Gradient Descent (SGD) Neural Network or You Only Look Once (YOLO) Neural Network to identity the product/s from the image frames. If multiple products i.e. neighbouring products are identified from a single image frame, each of the product and their corresponding images are stored in the database 103.

The comparison module 219 may compare the orientations of the one or more products and the neighbouring products that are identified by the identifier module 217 with historic orientations of products and neighbouring products associated with the rack from the database 103. The comparison is performed to identify if any of the one or more products and the neighbouring products are not oriented properly such that it is unsafe to handle that may cause injury or positioned improperly such that it may fall from the rack.

The identifier module 217 may identify at least one product from the one or more products and the neighbouring products that is improperly oriented based on comparison result obtained from the comparison module 219. For example, a user is buying a product, which has an oil can near to the product, which is leaking. If the user tries to touch or pick the product that is greasy due to oil leak, he/she may panic and if the oil is further spilled by chance it may cause injury to the user in case he/she walks over the oil. In such situation, the identifier module 217 may identify oil can next to the product that is improperly oriented or unsafe to handle.

The determiner module 221 may determine product safety handling instructions of the at least one product identified by the identifier module 217 based on historic product details stored in the database 103 and the identified orientations of the at least one product. In this step, the determiner module 221 may use image pruning techniques for the plurality of image frames of one or more product images and neighbouring products that are were collected from the handheld device 101 and IoT sensors to get rid of unwanted images. These images are given as input to the Capsule Net model for object or product classification. The Capsule Net model is trained on all the products in the store to classify them according to their product details. Based on these product details and their orientations in the rack, the products are identified as either safe or unsafe category. It may also be categorized as properly oriented or improperly oriented. These results are given to the bidirectional LSTM model, which outputs the appropriate guided English text based on the orientation of the product and product details. To train LSTM, the image frames are annotated with text indicating how the product in the image has to be handled based on its orientation. For instance, suppose an object is protruding along the edge of a rack, which may fall when user tries to pick it up. In this case trying to pick that product would make the product fall most of the time. For such products that are on the edge of the rack and may fall when tried to pick it up, the image may be annotated as, "Please push the product slightly on the rack to the left and then pick it up." All unsafe products like knife, consumer goods, razors, mechanic products, glass items, ceramic products, sharp products may be stored hierarchically with the most unsafe product on the top. The messages are annotated accordingly based on the unsafe product in the hierarchy. For instance, suppose the products like knife, glass item, shoes, biscuit pack are in sequence then the corresponding action or instruction messages will be annotated as below:

For knife: "Be extra careful!! The object has sharpened edge towards the left and blunt side on the right. Gently move it to the back before lifting it using the blunt side of the object".

For glass: "Please handle with extra care while you push it back since it is brittle object. Hold the entire object in hand while pushing it back".

For shoes: "Please push the object back on rack, use less force".

For biscuit pack: "Please push the object back on rack, it is light weight. Use minimum force".

These annotated images are given to bidirectional LSTM model and it is trained to generate text (instructions to handle the object/product). The model generates distinct text instructions for same objects but in different orientation. Whenever the identifier module 217 identifies the product is in unsafe position, the determiner module 221 feeds the image to the LSTM model and generates the instructions in English text on how to handle the product.

The assisting module 223 may assist the user in real-time with handling of the at least one product based on the product safety handling instructions determined by the determiner module 221.

The guided instruction module 225 may convert the product safety handling instructions to customized guided instructions based on the historic user details and the historic product details.

The guided instruction module 225 may receive the guided English text from the determiner module 221 generated by the LSTM model. The guided text is specific to the product and the orientation of the product. The guided instruction module 225 may take historic user details and the historic product details from the database 103 and present it to deep learning NLP system along with the received guided English text. The output of the NLP system may be the customized guided instructions based on the user and product details. For example, for adults of all ages >15 years, the customized guided instruction may be as given below:

"This is sharp item, it is placed at two racks above. The left edge is protruded, be careful and use the blunt side of the object which is on the right side to handle it".

For kids <15 years or disabled persons who are on wheel chair or adults whose height is <height of the rack where product is placed, this product will not be allowed to be bought by them since it is unsafe.

For persons who are senior citizens, either the person is not be allowed to buy or the customized guided instruction may be as given below:

"Please be extra careful!!! This is sharp item, it is placed at two racks above. The left edge is protruded, be careful and use the blunt side of the object which is on the right to handle it".

If the disabilities characteristics indicates not to allow sharp items to be handled, then the product will not be allowed to be bought by that person.

Based on the product shape, size and placement in the rack, various instructions are generated for handling all the dangerous objects safely. As explained above based on the product orientation on the rack, how much movement is required or how to approach the product is decided. For dangerous objects like "knife", customized guided instructions are provided with exact movement of hand position to approach the blunt end of the knife.

The preferred medium module 227 may convert the customized guided instructions into a user preferred medium based on the historic user details. The customized guided instructions generated by the guided instruction module 225 may be fetched. The preferred medium module 227 may extract the user details from the database 103 and based on the user details it may use suitable techniques to adapt the messages to be given to the handheld device 101, which outputs the messages in the form of audio format, text format or braille script format as requested by the user.

The assisting module 223 may communicate with the handheld device 101 through the user preferred medium to assist the user.

Figure 3:
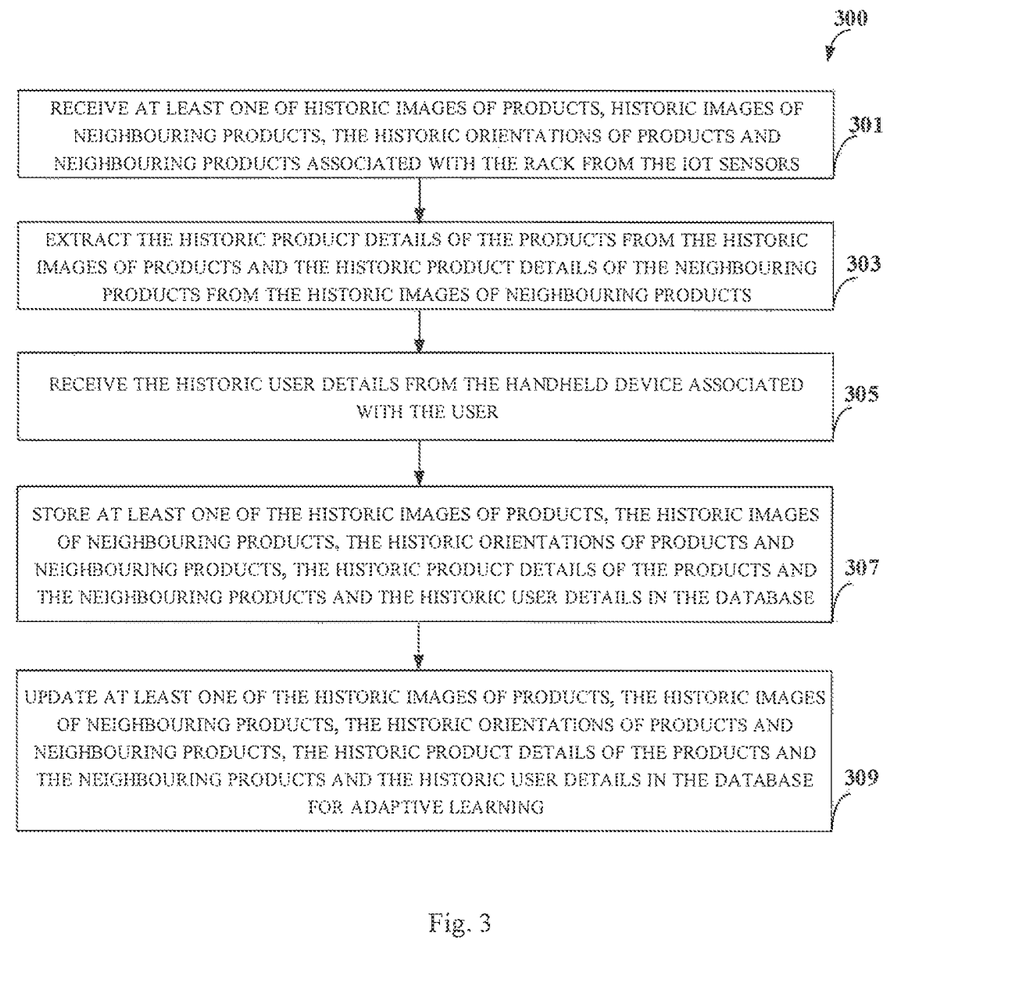
FIG. 3 illustrates a flowchart showing a method for populating a database to be used in assisting user with product handling in accordance with some embodiments of present disclosure.

FIG. 3 illustrates a flowchart showing a method for populating a database to be used in assisting user with product handling in accordance with some embodiments of present disclosure.

As illustrated in FIG. 3, the method 300 includes one or more blocks for populating the database 103. The method 300 may be described in the general context of computer executable instructions. Generally, computer executable instructions can include routines, programs, objects, components, data structures, procedures, modules, and functions, which perform particular functions or implement particular abstract data types.

The order in which the method 300 is described is not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

At block 301, the receiver module 215 may receive at least one of historic images of products, historic images of neighbouring products, the historic orientations of products and neighbouring products associated with the rack from the IoT sensors. The historic images and historic orientations refer to images and orientations received during training phase.

At block 303, the extraction module 213 may extracting the historic product details of the products from the historic images of products and the historic product details of the neighbouring products from the historic images of neighbouring products. The historic product details may comprise at least one of product name, product type, product being properly oriented or improperly oriented, product handling instruction, the rack information and product characteristics.

At block 305, the receiver module 215 may receive the historic user details from the handheld device associated with the user. The historic user details may comprise at least one of user age, user gender, user preferences, user behavioural characteristics, user disability characteristics, user height and user weight. The historic user details may be provided by a user through a handheld device associated with the user.

At block 307, the other modules 229 may store at least one of the historic images of products, the historic images of neighbouring products, the historic orientations of products and neighbouring products, the historic product details of the products and the neighbouring products and the historic user details in the database 103.

At block 309, the other modules 229 may update at least one of the historic images of products, the historic images of neighbouring products, the historic orientations of products and neighbouring products, the historic product details of the products and the neighbouring products and the historic user details in the database 103 for adaptive learning. The update may happen at pre-defined intervals of time.

Figure 4A:
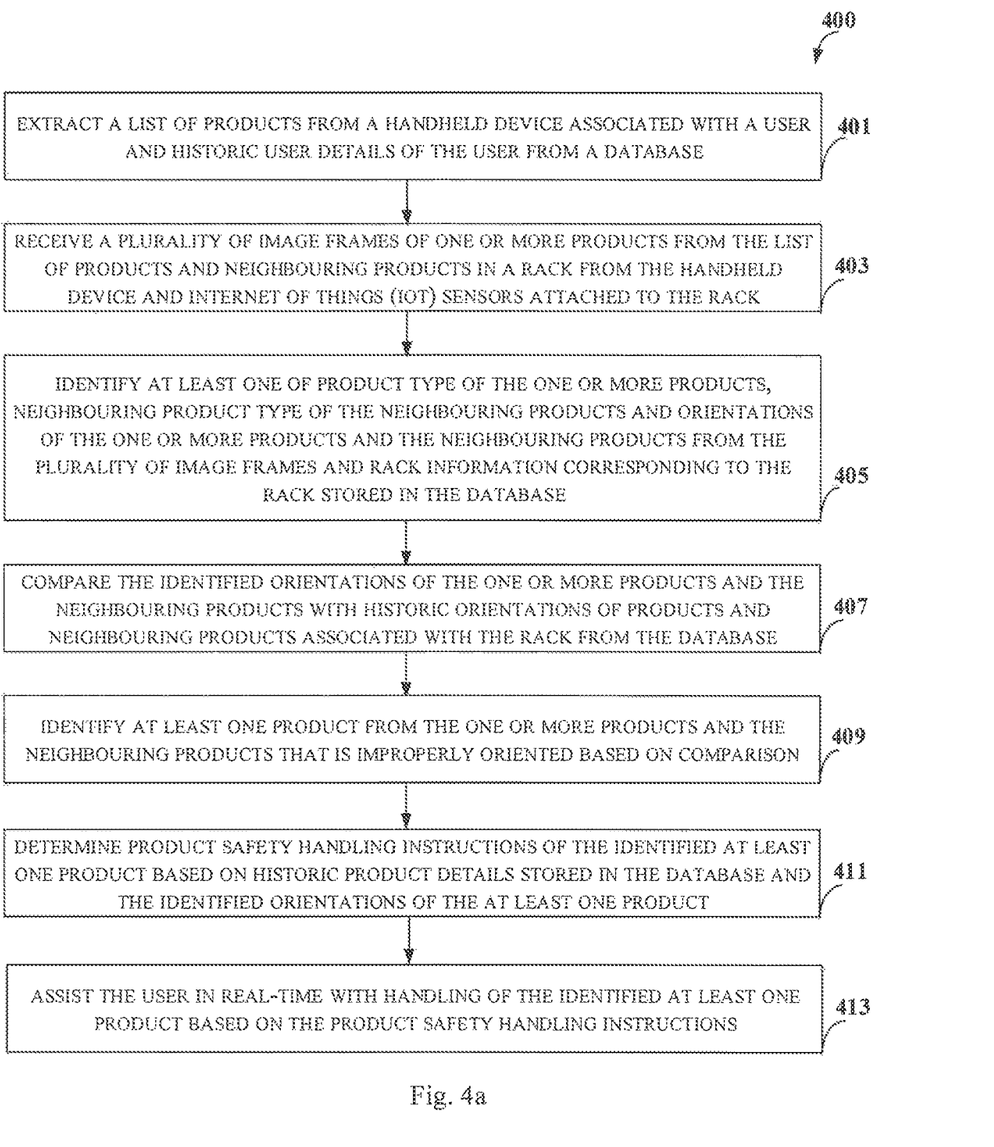
FIG. 4a-FIG. 4b illustrates an exemplary representation of assisting user with product handling in a retail shopping in real-time in accordance with some embodiments of present disclosure.
Figure 4B:
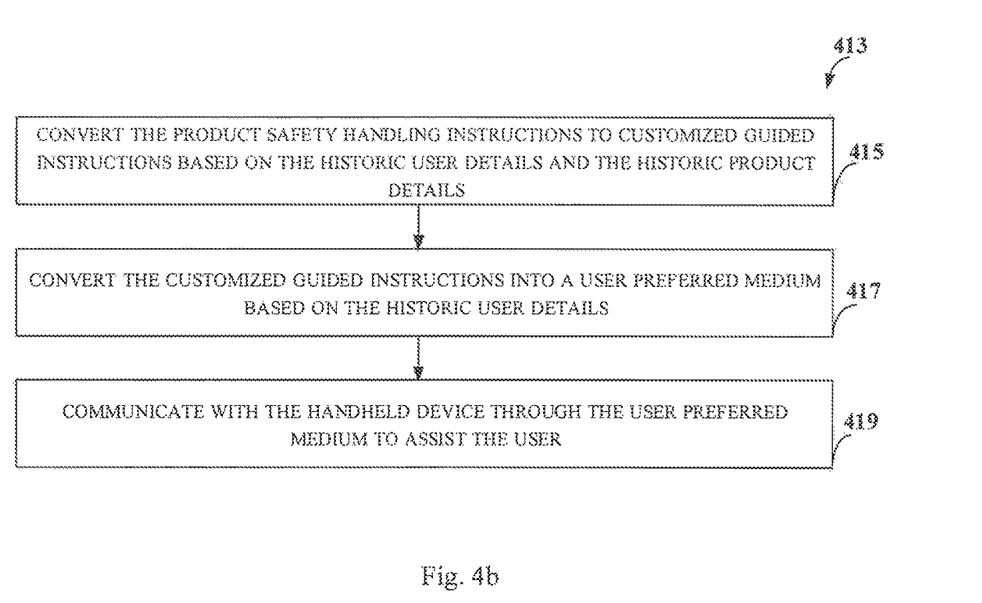

FIG. 4a-FIG. 4b illustrates an exemplary representation of assisting user with product handling in a retail shopping in real-time in accordance with some embodiments of present disclosure.

As illustrated in FIG. 4a-FIG. 4b, the method 400 includes one or more blocks for assisting user with product handling in a retail shopping in real-time. The method 400 may be described in the general context of computer executable instructions. Generally, computer executable instructions can include routines, programs, objects, components, data structures, procedures, modules, and functions, which perform particular functions or implement particular abstract data types.

The order in which the method 400 is described is not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

At block 401, the extraction module 213 may extract a list of products from the handheld device 101 associated with a user and historic user details of the user from the database 103. The list of products may be entered or loaded by the user in the handheld device 101.

At block 403, the receiver module 215 may receive a plurality of image frames of one or more products from the list of products and neighbouring products in a rack from the handheld device 101 and IoT sensors attached to the rack. The image frames may include at least one of image and video of the one or more products.

At block 405, the identifier module 217 may identify at least one of product type of the one or more products, neighbouring product type of the neighbouring products and orientations of the one or more products and the neighbouring products from the plurality of image frames and rack information corresponding to the rack stored in the database 103.

At block 407, the comparison module 219 may compare the identified orientations of the one or more products and the neighbouring products with historic orientations of products and neighbouring products associated with the rack from the database 103.

At block 409, the identifier module 217 may identify at least one product from the one or more products and the neighbouring products that is improperly oriented based on comparison performed at block 407.

At block 411, the determiner module 221 may determine product safety handling instructions of the identified at least one product based on historic product details stored in the database 103 and the identified orientations of the at least one product at block 409.

At block 413, the assisting module 223 may assist the user in real-time with handling of the identified at least one product based on the product safety handling instructions.

FIG. 4b illustrates a flowchart showing a method for communicating product safety handling instructions into a user preferred medium in accordance with some embodiments of present disclosure.

At block 415, the guided instruction module 225 may convert the product safety handling instructions to customized guided instructions based on the historic user details and the historic product details.

At block 417, the preferred medium module 227 may convert the customized guided instructions into a user preferred medium based on the historic user details. The user preferred medium may comprise at least one of audio format, video format, text format and braille script format.

At block 419, the assisting module 223 may communicate with the handheld device 101 through the user preferred medium to assist the user.

Few examples are presented below based on FIGS. 4a and 4b.

Example 1: John, an old professor, visits a mall for shopping. While exploring the items to purchase in the mall, he reaches grocery section. As John was about to pick a packet of cooking oil, the product assistance system of the present disclosure running on his mobile device immediately alerts him with a text message "Hey, the oil packets are greasy. Please hold them with a tissue placed on the backside". This saves John from getting his hands dirty. Continuing with his shopping, John then visits kitchen knife section. The product assistance system of the present disclosure once again warns him with a new text message "Hey, watch out while pulling the knife. The one close to you has come out from the wrapper and obliquely placed. Pull it from the rear end if you want it".

Example 2: Tina visits a mall to buy household items. She takes apiece of a glassware and places it back obliquely near the edge of a rack, which is likely to fall. The product assistance system of the present disclosure running on her mobile device alerts her through an audio message "Hey, request to keep the glassware away from the edge". This saves from the potential destruction of the glassware.

Some of the advantages of the present disclosure are listed below.

The present disclosure reduces risk of user getting injured or harmed due to dangerous items in a shop left in improper condition or unintended orientation by providing alerts to the user.

The present disclosure provides guidance to the user on how to handle an item safely, which otherwise could lead to injury to the user or damage to the item.

The present disclosure supports checking of dynamic evolution or orientation of object placement in real time.

Computing System

Figure 5:
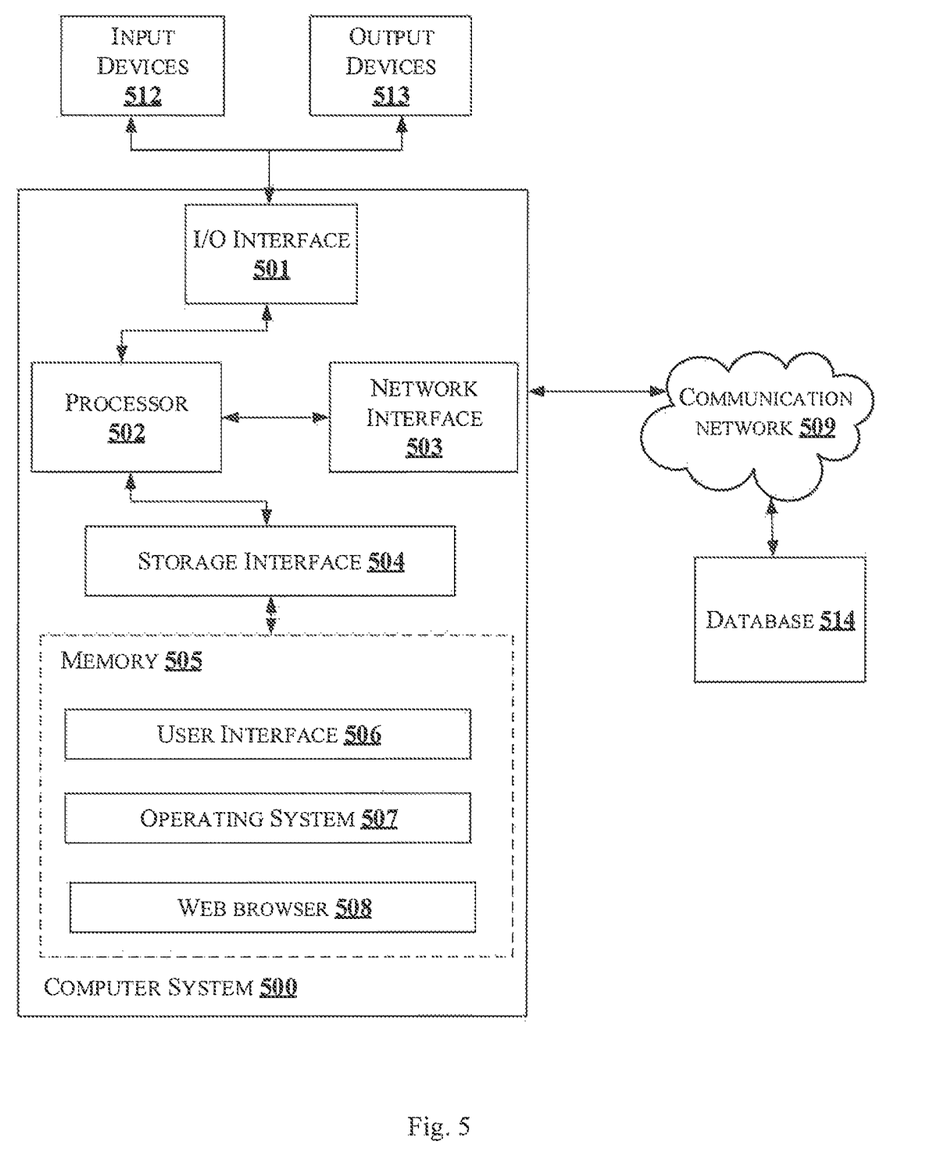
FIG. 5 illustrates a block diagram of an exemplary computer system for implementing embodiments consistent with the present disclosure.

FIG. 5 illustrates a block diagram of an exemplary computer system 500 for implementing embodiments consistent with the present disclosure. In an embodiment, the computer system 500 may be used to implement the product assistance system 107. The computer system 500 may include a central processing unit ("CPU" or "processor") 502. The processor 502 may include at least one data processor for assisting user with product handling in a retail shopping in real-time. The processor 502 may include specialized processing units such as, integrated system (bus) controllers, memory management control units, floating point units, graphics processing units, digital signal processing units, etc.

The processor 502 may be disposed in communication with one or more input/output (I/O) devices (not shown) via I/O interface 501. The I/O interface 501 employ communication protocols/methods such as, without limitation, audio, analog, digital, monoaural, Radio Corporation of America (RCA) connector, stereo, IEEE-1394 high speed serial bus, serial bus, Universal Serial Bus (USB), infrared, Personal System/2 (PS/2) port, Bayonet Neill-Concelman (BNC) connector, coaxial, component, composite, Digital Visual Interface (DVI), High-Definition Multimedia Interface (HDMI), Radio Frequency (RF) antennas, S-Video, Video Graphics Array (VGA), IEEE 802.11b/g/n/x, Bluetooth, cellular e.g., Code-Division Multiple Access (CDMA), High-Speed Packet Access (HSPA+), Global System for Mobile communications (GSM), Long-Term Evolution (LTE), Worldwide interoperability for Microwave access (WiMax), or the like, etc.

Using the I/O interface 501, the computer system 500 may communicate with one or more I/O devices such as input devices 512 and output devices 513. For example, the input devices 512 may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The output devices 513 may be a printer, fax machine, video display (e.g., Cathode Ray Tube (CRT), Liquid Crystal Display (LCD), Light-Emitting Diode (LED), plasma, Plasma Display Panel (PDP), Organic Light-Emitting Diode display (OLED) or the like), audio speaker, etc.

In some embodiments, the computer system 500 consists of the product assistance system 107. The processor 502 may be disposed in communication with the communication network 509 via a network interface 503. The network interface 503 may communicate with the communication network 509. The network interface 503 may employ connection protocols including, without limitation, direct connect, Ethernet (e.g., twisted pair 10/100/1000 Base T), Transmission Control Protocol/Internet Protocol (TCP/IP), token ring, IEEE 802.11a/b/g/n/x, etc. The communication network 509 may include, without limitation, a direct interconnection, Local Area Network (LAN), Wide Area Network (WAN), wireless network (e.g., using Wireless Application Protocol), the Internet, etc. Using the network interface 503 and the communication network 509, the computer system 500 may communicate with a database 514. The network interface 503 may employ connection protocols include, but not limited to, direct connect, Ethernet (e.g., twisted pair 10/100/1000 Base T), Transmission Control Protocol/Internet Protocol (TCP/IP), token ring, IEEE 802.11a/b/g/n/x, etc.

The communication network 509 includes, but is not limited to, a direct interconnection, a Peer to Peer (P2P) network, Local Area Network (LAN), Wide Area Network (WAN), wireless network (e.g., using Wireless Application Protocol), the Internet, Wi-Fi and such. The first network and the second network may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the first network and the second network may include a variety of network devices, including routers, bridges, servers, computing devices, storage devices, etc.

In some embodiments, the processor 502 may be disposed in communication with a memory 505 (e.g., RAM, ROM, etc. not shown in FIG. 5) via a storage interface 504. The storage interface 504 may connect to memory 505 including, without limitation, memory drives, removable disc drives, etc., employing connection protocols such as, Serial Advanced Technology Attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 505 may store a collection of program or database components, including, without limitation, user interface 506, an operating system 507, etc. In some embodiments, computer system 500 may store user/application data, such as, the data, variables, records, etc., as described in this disclosure. Such databases may be implemented as fault-tolerant, relational, scalable, secure databases such as Oracle or Sybase.

The operating system 507 may facilitate resource management and operation of the computer system 500. Examples of operating systems include, without limitation, APPLE® MACINTOSH® OS X®, UNIX®, UNIX-like system distributions (E.G., BERKELEY SOFTWARE DISTRIBUTION® (BSD), FREEBSD®, NETBSD®, OPENBSD, etc.), LINUX® DISTRIBUTIONS (E.G., RED HAT®, UBUNTU®, KUBUNTU®, etc.), IBM®OS/2®, MICROSOFT® WINDOWS® (XP®, VISTA®/7/8, 10 etc.), APPLE® IOS®, GOOGLE™ ANDROID™, BLACKBERRY® OS, or the like.

In some embodiments, the computer system 500 may implement web browser 508 stored program components. Web browser 508 may be a hypertext viewing application, such as MICROSOFT® INTERNET EXPLORER®, GOOGLE™ CHROME™, MOZILLA® FIREFOX®, APPLE® SAFARI®, etc. Secure web browsing may be provided using Secure Hypertext Transport Protocol (HTTPS), Secure Sockets Layer (SSL), Transport Layer Security (TLS), etc. Web browsers 508 may utilize facilities such as AJAX, DHTML, ADOBE® FLASH®, JAVASCRIPT®, JAVA®, Application Programming Interfaces (APIs), etc. The computer system 500 may implement a mail server (not shown in FIG. 5) stored program component. The mail server may be an Internet mail server such as Microsoft Exchange, or the like. The mail server may utilize facilities such as ASP, ACTIVEX®, ANSI® C++/C #, MICROSOFT®, .NET, CGI SCRIPTS, JAVA®, JAVASCRIP®, PERL®, PHP, PYTHON®, WEBOBJECTS®, etc. The mail server may utilize communication protocols such as Internet Message Access Protocol (IMAP), Messaging Application Programming Interface (MAPI), MICROSOFT® exchange, Post Office Protocol (POP), Simple Mail Transfer Protocol (SMTP), or the like. The computer system 500 may implement a mail client (not shown in FIG. 5) stored program component. The mail client may be a mail viewing application, such as APPLE® MAIL, MICROSOFT® ENTOURAGE®, MICROSOFT® OUTLOOK®, MOZILLA® THUNDERBIRD®, etc.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include Random Access Memory (RAM), Read-Only Memory (ROM), volatile memory, non-volatile memory, hard drives, CD ROMs, DVDs, flash drives, disks, and any other known physical storage media.

The described operations may be implemented as a method, system or article of manufacture using standard programming and/or engineering techniques to produce software, firmware, hardware, or any combination thereof. The described operations may be implemented as code maintained in a "non-transitory computer readable medium", where a processor may read and execute the code from the computer readable medium. The processor is at least one of a microprocessor and a processor capable of processing and executing the queries. A non-transitory computer readable medium may include media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. Further, non-transitory computer-readable media include all computer-readable media except for a transitory. The code implementing the described operations may further be implemented in hardware logic (e.g., an integrated circuit chip, Programmable Gate Array (PGA), Application Specific Integrated Circuit (ASIC), etc.).

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary, a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIGS. 3, 4a and 4b show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

REFERRAL NUMERALS:

| Reference number | Description |
| --- | --- |
| 100 | Environment |
| 101 | Handheld device |
| 103 | Database |
| 105 | Communication network |
| 107 | Product assistance system |
| 111 | I/O interface |
| 113 | Memory |
| 115 | Processor |
| 200 | Data |
| 201 | Product list data |
| 203 | Image frame data |
| 205 | Other data |
| 211 | Modules |
| 213 | Extraction module |
| 215 | Receiver module |
| 217 | Identifier module |
| 219 | Comparison module |
| 221 | Determiner module |
| 223 | Assisting module |
| 225 | Guided instruction module |
| 227 | Preferred medium module |
| 229 | Other modules |
| 500 | Computer system |
| 501 | I/O interface |
| 502 | Processor |
| 503 | Network interface |
| 504 | Storage interface |
| 505 | Memory |
| 506 | User interface |
| 507 | Operating system |
| 508 | Web browser |
| 509 | Communication network |
| 512 | Input devices |
| 513 | Output devices |
| 514 | Database |

What is claimed is:

1. A method of assisting user with product handling in a retail shopping in real-time, the method comprising:
   extracting, by a product assistance system, a list of products from a handheld device associated with a user and historic user details of the user from a database;
   receiving, by the product assistance system, a plurality of image frames of one or more products from the list of products and neighbouring products in a rack from the handheld device and Internet of Things (IoT) sensors attached to the rack;
   identifying, by the product assistance system, at least one of product type of the one or more products, neighbouring product type of the neighbouring products and orientations of the one or more products and the neighbouring products from the plurality of image frames and rack information corresponding to the rack stored in the database;
   comparing, by the product assistance system, the identified orientations of the one or more products and the neighbouring products with historic orientations of products and neighbouring products associated with the rack from the database;
   identifying, by the product assistance system, using an artificial neural network, at least one product from the one or more products and the neighbouring products that is improperly oriented based on comparison;
   determining, by the product assistance system, using the artificial neural network, product safety handling instructions of the identified at least one product based on historic product details stored in the database and the identified orientations of the at least one product;
   receiving, by the product assistance system, at least one of historic images of products, historic images of neighbouring products, the historic orientations of products and neighbouring products associated with the rack from the IoT sensors;

extracting, by the product assistance system, the historic product details of the products from the historic images of products and the historic product details of the neighbouring products from the historic images of neighbouring products;

receiving, by the product assistance system, the historic user details from the handheld device associated with the user;

storing, by the product assistance system, at least one of the historic images of products, the historic images of neighbouring products, the historic orientations of products and neighbouring products, the historic product details of the products and the neighbouring products and the historic user details in the database; and assisting, by the product assistance system, the user in real-time with handling of the identified at least one product based on the product safety handling instructions.

2. The method as claimed in claim 1, wherein assisting the user in real-time comprising:

converting, by the product assistance system, the product safety handling instructions to customized guided instructions based on the historic user details and the historic product details;

converting, by the product assistance system, the customized guided instructions into a user preferred medium based on the historic user details; and communicating, by the product assistance system, with the handheld device through the user preferred medium to assist the user.

3. The method as claimed in claim 1, the method further comprising:

providing, by the product assistance system, a shopping route to access the list of products in a shop based on at least one of the list of products, the historic user details and product purchase priority of the user.

4. The method as claimed in claim 1, the method further comprising:

updating, by the product assistance system, at least one of the historic images of products, the historic images of neighbouring products, the historic orientations of products and neighbouring products, the historic product details of the products and the neighbouring products and the historic user details in the database for adaptive learning.

5. The method as claimed in claim 1, wherein the user preferred medium comprises at least one of audio format, video format, text format and braille script format.

6. The method as claimed in claim 1, wherein the historic user details comprise at least one of user age, user gender, user preferences, user behavioural characteristics, user disability characteristics, user height and user weight.

7. The method as claimed in claim 1, wherein the historic product details comprise at least one of product name, product type, product being properly oriented or improperly oriented, product handling instruction, the rack information and product characteristics.

8. A product assistance system for assisting user with product handling in a retail shopping in real-time, the product assistance system comprising:

a processor; and a memory communicatively coupled to the processor, wherein the memory stores processor-executable instructions, which on execution, cause the processor to:

extract a list of products from a handheld device associated with a user and historic user details of the user from a database;

receive a plurality of image frames of one or more products from the list of products and neighbouring products in a rack from the handheld device and Internet of Things (IoT) sensors attached to the rack;

identify at least one of product type of the one or more products, neighbouring product type of the neighbouring products and orientations of the one or more products and the neighbouring products from the plurality of image frames and rack information corresponding to the rack stored in the database;

compare the identified orientations of the one or more products and the neighbouring products with historic orientations of products and neighbouring products associated with the rack from the database;

identify, using an artificial neural network, at least one product from the one or more products and the neighbouring products that is improperly oriented based on comparison;

determine, using the artificial neural network, product safety handling instructions of the identified at least one product based on historic product details stored in the database and the identified orientations of the at least one product;

receive at least one of historic images of products, historic images of neighbouring products and the historic orientations of products and neighbouring products associated with the rack from the IoT sensors;

extract the historic product details of the products from the historic images of products and the historic product details of the neighbouring products from the historic images of neighbouring products;

receive the historic user details from the handheld device associated with the user;

store at least one of the historic images of products, the historic images of neighbouring products, the historic orientations of products and neighbouring products, the historic product details of the products and the neighbouring products and the historic user details in the database; and assist the user in real-time with handling of the identified at least one product based on the product safety handling instructions.

9. The product assistance system as claimed in claim 8, the product assistance system causes the processor to:

convert the product safety handling instructions to customized guided instructions based on the historic user details and the historic product details;

convert the customized guided instructions into a user preferred medium based on the historic user details; and communicate with the handheld device through the user preferred medium to assist the user.

10. The product assistance system as claimed in claim 9, the product assistance system causes the processor to:

provide a shopping route to access the list of products in a shop based on at least one of the list of products, the historic user details and product purchase priority of the user.

11. The product assistance system as claimed in 8, the product assistance system causes the processor to:
update at least one of the historic images of products, the historic images of neighbouring products, the historic orientations of products and neighbouring products, the historic product details of the products and the neighbouring products and the historic user details in the database for adaptive learning.

12. The product assistance system as claimed in 8, wherein the user preferred medium comprises at least one of audio format, video format, text format and braille script format.

13. The product assistance system as claimed in 8, wherein the historic user details comprise at least one of user age, user gender, user preferences, user behavioural characteristics, user disability characteristics, user height and user weight.

14. The product assistance system as claimed in 8, wherein the historic product details comprise at least one of product name, product type, product being properly oriented or improperly oriented, product handling instruction, the rack information and product characteristics.

15. A non-transitory computer readable medium including instructions stored thereon that when processed by at least one processor cause a product assistance system to perform operations comprising:
extracting a list of products from a handheld device associated with a user and historic user details of the user from a database;
receiving a plurality of image frames of one or more products from the list of products and neighbouring products in a rack from the handheld device and Internet of Things (IoT) sensors attached to the rack;
identifying at least one of product type of the one or more products, neighbouring product type of the neighbouring products and orientations of the one or more products and the neighbouring products from the plurality of image frames and rack information corresponding to the rack stored in the database;
comparing the identified orientations of the one or more products and the neighbouring products with historic orientations of products and neighbouring products associated with the rack from the database;
identifying, using an artificial neural network, at least one product from the one or more products and the neighbouring products that is improperly oriented based on comparison;
determining, using the artificial neural network, product safety handling instructions of the identified at least one product based on historic product details stored in the database and the identified orientations of the at least one product;
receiving at least one of historic images of products, historic images of neighbouring products and the historic orientations of products and neighbouring products associated with the rack from the IoT sensors;
extracting the historic product details of the products from the historic images of products and the historic product details of the neighbouring products from the historic images of neighbouring products;
receiving the historic user details from the handheld device associated with the user; and
storing at least one of the historic images of products, the historic images of neighbouring products, the historic orientations of products and neighbouring products, the historic product details of the products and the neighbouring products and the historic user details in the database; and
assisting the user in real-time with handling of the identified at least one product based on the product safety handling instructions.

16. The non-transitory computer readable medium as claimed in claim 15, wherein the instructions cause the processor to:
convert the product safety handling instructions to customized guided instructions based on the historic user details and the historic product details;
convert the customized guided instructions into a user preferred medium based on the historic user details; and
communicate with the handheld device through the user preferred medium to assist the user.

17. The non-transitory computer readable medium as claimed in claim 15, wherein the instructions cause the processor to:
provide a shopping route to access the list of products in a shop based on at least one of the list of products, the historic user details and product purchase priority of the user.

* * * * *